(12) United States Patent
Dooley

(10) Patent No.: US 7,690,186 B2
(45) Date of Patent: Apr. 6, 2010

(54) GAS TURBINE ENGINE INCLUDING APPARATUS TO TRANSFER POWER BETWEEN MULTIPLE SHAFTS

(75) Inventor: Kevin Allen Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1154 days.

(21) Appl. No.: 11/269,699

(22) Filed: Nov. 9, 2005

(65) Prior Publication Data

US 2007/0101696 A1  May 10, 2007

(51) Int. Cl.
*F02G 1/00* (2006.01)
(52) U.S. Cl. ..................... 60/39.511; 60/770
(58) Field of Classification Search ............... 60/226.1, 60/262, 266, 39.093, 736, 792, 770, 224, 60/225, 229; 415/178
See application file for complete search history.

(56) References Cited

U.S. PATENT DOCUMENTS

| | | | | |
|---|---|---|---|---|
| 3,060,679 A | * | 10/1962 | Schmitt | 60/224 |
| 3,684,857 A | * | 8/1972 | Morley et al. | 210/201 |
| 3,705,491 A | * | 12/1972 | Foster-Pegg | 60/39.55 |
| 3,796,854 A | * | 3/1974 | Bennett et al. | 219/201 |
| 3,797,233 A | * | 3/1974 | Webb et al. | 60/791 |
| 3,922,849 A | * | 12/1975 | Kors et al. | 60/39.512 |
| 3,999,378 A | * | 12/1976 | Tatem et al. | 60/737 |
| 4,089,638 A | * | 5/1978 | Trucco et al. | 431/209 |
| 4,137,708 A | * | 2/1979 | Aspinwall et al. | 60/204 |
| 4,262,482 A | * | 4/1981 | Roffe et al. | 60/736 |
| 4,782,658 A | * | 11/1988 | Perry | 60/226.1 |
| 5,131,812 A | * | 7/1992 | Boyd et al. | 416/95 |
| 5,174,717 A | * | 12/1992 | Moore | 416/39 |
| 5,683,062 A | * | 11/1997 | Spiro et al. | 244/121 |
| 5,694,765 A | | 12/1997 | Hield et al. | |
| 5,802,854 A | * | 9/1998 | Maeda et al. | 60/737 |
| 5,845,483 A | | 12/1998 | Petrowicz | |
| 6,107,693 A | | 8/2000 | Mongia et al. | |
| 6,125,625 A | | 10/2000 | Lipinski et al. | |
| 6,167,692 B1 | * | 1/2001 | Anand et al. | 60/39.182 |
| 6,467,725 B1 | | 10/2002 | Coles et al. | |
| 6,606,864 B2 | | 8/2003 | MacKay | |
| 6,672,049 B2 | | 1/2004 | Franchet et al. | |
| 6,725,645 B1 | * | 4/2004 | Wadia et al. | 60/226.1 |
| 6,735,954 B2 | | 5/2004 | MacFarlane et al. | |
| 6,873,071 B2 | | 3/2005 | Dooley | |
| 6,960,840 B2 | * | 11/2005 | Willis et al. | 290/52 |
| 7,131,815 B2 | * | 11/2006 | Allford et al. | 415/160 |
| 2002/0083714 A1 | | 7/2002 | Bakholdin | |
| 2002/0099476 A1 | | 7/2002 | Hamrin et al. | |
| 2004/0065092 A1 | | 4/2004 | Wadia et al. | |
| 2007/0089423 A1 | * | 4/2007 | Norman et al. | 60/772 |
| 2008/0279688 A1 | * | 11/2008 | Jensen et al. | 416/95 |

FOREIGN PATENT DOCUMENTS

GB    2 397 347 A    7/2004

OTHER PUBLICATIONS

International Search Report PCT/CA2006/001273, Nov. 22, 2006.
European Search Report of Feb. 9, 2007.

* cited by examiner

*Primary Examiner*—William H Rodriguez
(74) *Attorney, Agent, or Firm*—Ogilvy Renault LLP

(57) ABSTRACT

The gas turbine engine comprises at least one electrical generator and an electrical heater associated with a gas path of the engine. The heater is powered by the generator to selectively add heat to the gas turbine cycle.

9 Claims, 4 Drawing Sheets

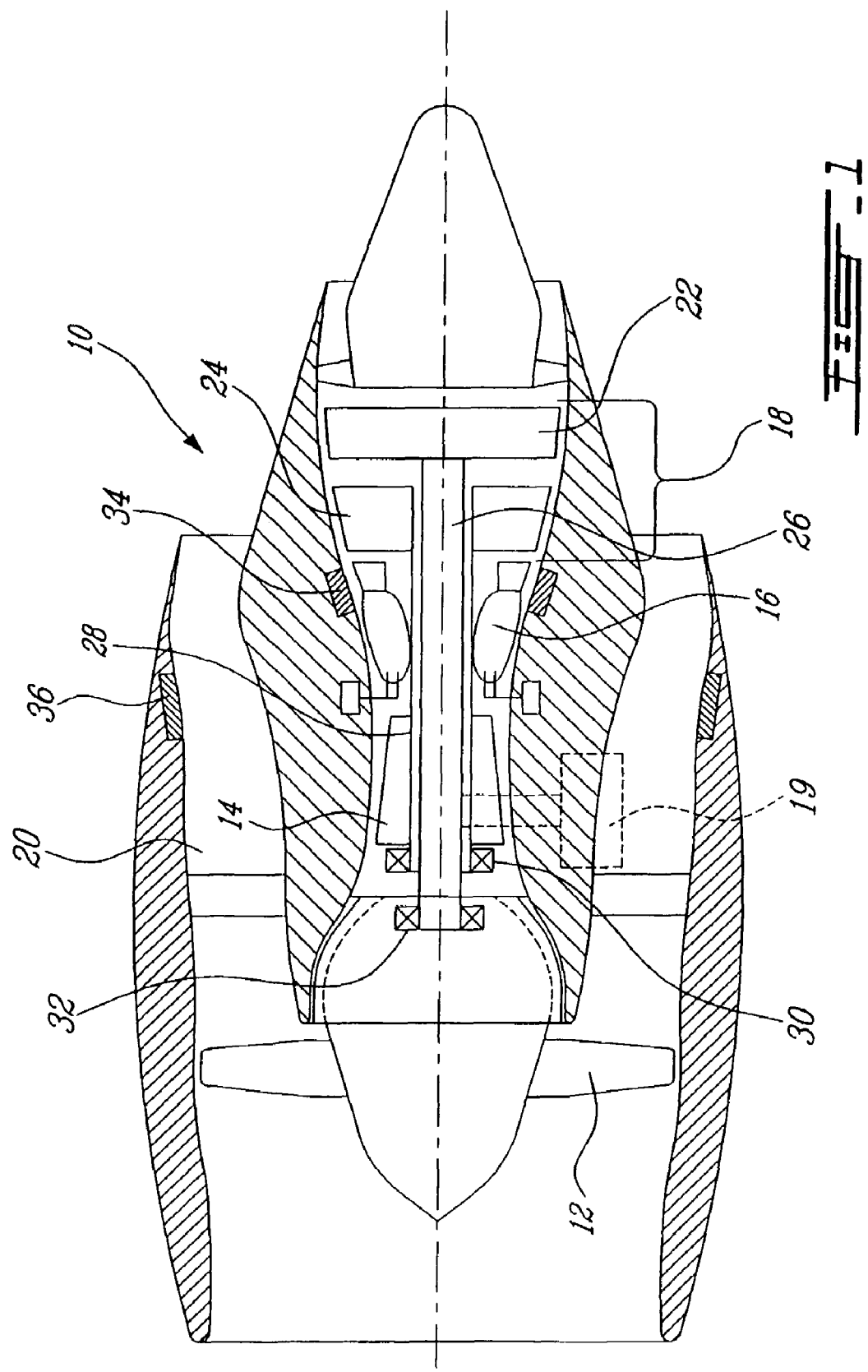

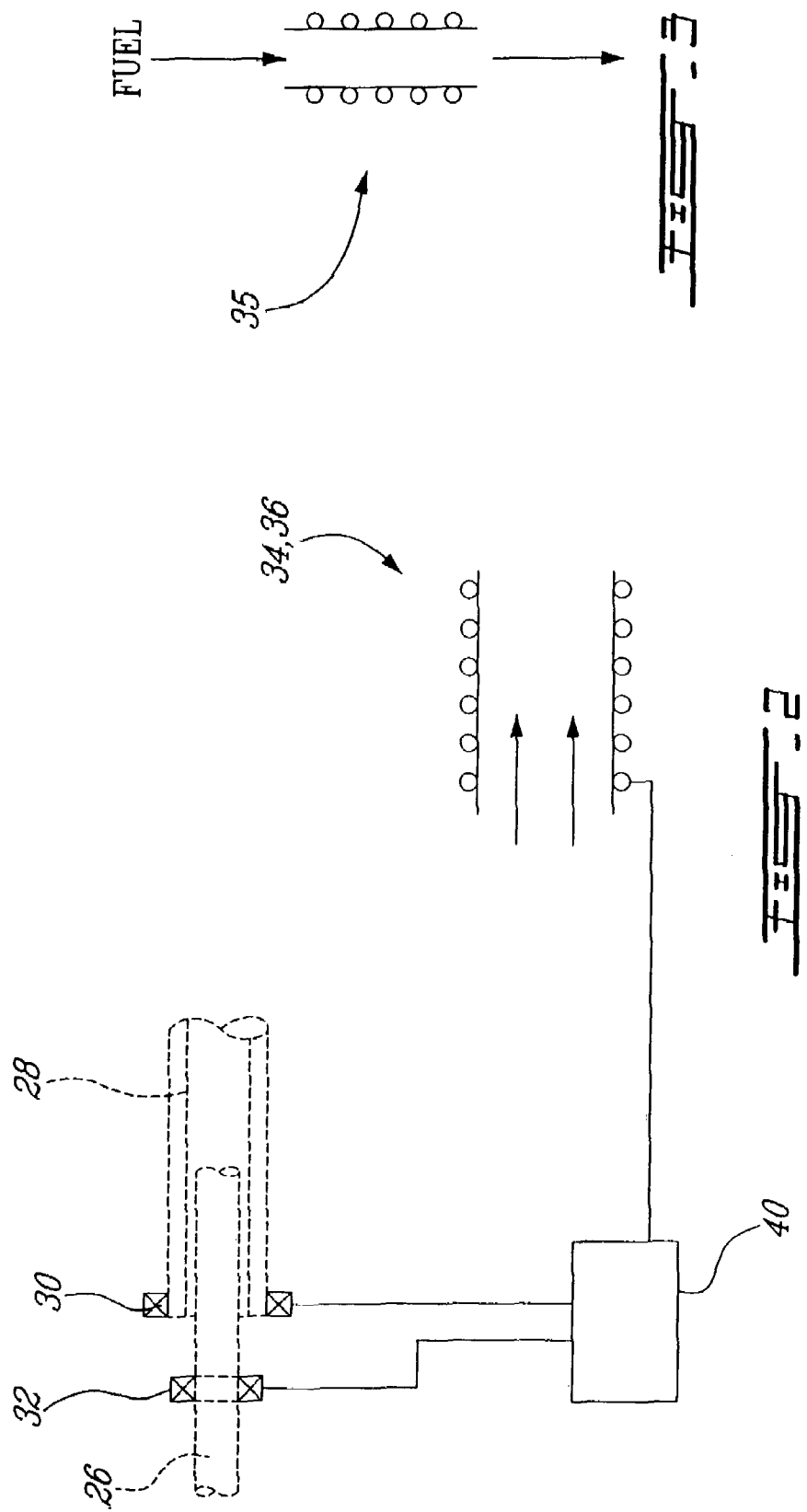

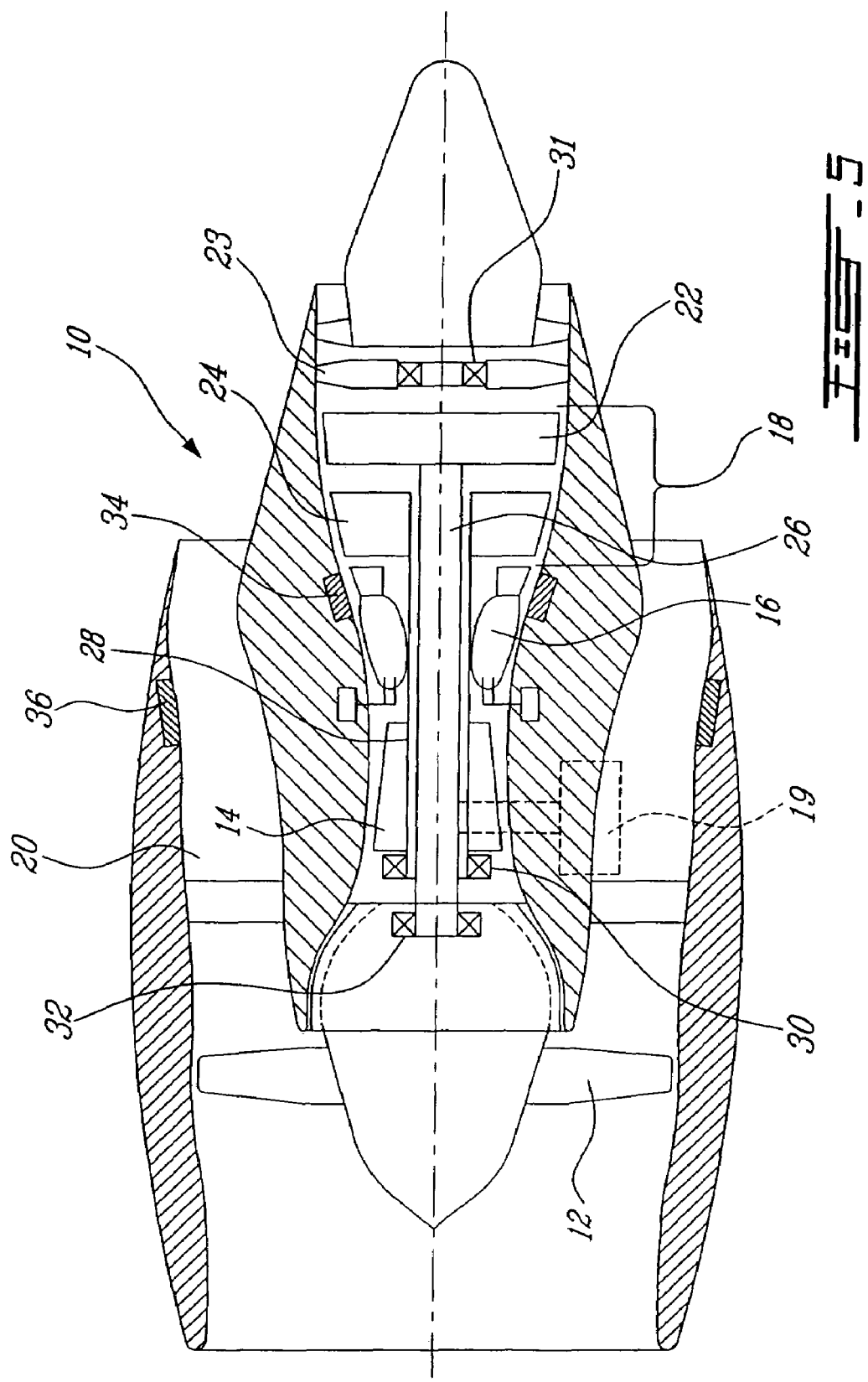

GAS TURBINE ENGINE INCLUDING APPARATUS TO TRANSFER POWER BETWEEN MULTIPLE SHAFTS

TECHNICAL FIELD

The invention relates generally to gas turbine engines, and more particularly, to their construction and operation.

BACKGROUND OF THE ART

Gas turbine engines, especially those mounted on aircrafts, are known to operate under a wide range of conditions and power requirements. In a typical cycle, a gas turbine engine rotates at high speeds during takeoff and climb segments, while running at lower speeds during other segments, such as warm-up, taxiing, cruise and descent. Gas turbine engines must also operate under various temperatures, pressure and air speeds throughout a same engine cycle. All these requirements generally lead to various design compromises so that the engines can deliver a good performance at all times. As with all optimization, however, at some points during an engine cycle, one portion of an engine may be capable of generating more power than is required with reference to the selected operating point of one or more portions of the engine. In other words, in optimization, sometimes excess capacity in the engine is left unused.

U.S. Pat. No. 5,694,765 to Hield et al. discloses a mechanism by which power may be transferred from one gas turbine engine spool to another within a multi-spool engine. However, there is a continuing need to provide an improved engine design and method by which engine power can be transferred and used optimally.

SUMMARY OF THE INVENTION

It is therefore an object of this invention to provide an improved gas turbine engine.

In one aspect, the present invention provides a gas turbine engine comprising: at least one electrical generator rotationally connected to an engine shaft; an electrical heater associated with a gas path of the engine and adapted to heat gases in the gas path, the heater being electrically connected to the generator, and a controller adapted to selectively control the heater to add heat to the gas path.

In another aspect, the present invention provides a gas turbine engine comprising: at least a first and a second shaft, the first shaft rotatably supporting at least a propulsor and a low pressure turbine, the second shaft rotatably supporting at least a compressor and a high pressure turbine; an electrical generator mounted to the first shaft; and an electrical heater electrically connected to the generator, the heater being provided to selectively add heat to gases in a gas path passing through the high pressure turbine.

In another aspect, the present invention provides a gas turbine engine comprising: means for transforming torque from an engine shaft into electrical power; means for heating gases in a gas path within the engine using the electrical power from the first means so as to increase thrust caused by the gases in the gas path; and means for controlling the electrical power transferred from the first means to the second means.

In another aspect, the present invention provides a method of generating thrust by transferring power between a first and a second location in a gas turbine engine, the method comprising: transforming torque generated by the engine into electrical power; and using the electrical power to heat gases in a gas path.

In another aspect, the present invention provides a method of generating thrust by transferring power between two gas, turbine engines, the method comprising: transforming torque generated in the first gas turbine engine into electrical power; and adding heat to gases in a gas path of the second gas turbine engine using the electrical power from the first gas turbine engine, at least a portion of the added heat in the second gas turbine engine being converted into mechanical power.

In another aspect, the present invention provides an aircraft gas turbine engine, the engine including comprising at least a compression stage, a combustion stage and a turbine stage, the compression stage and turbine stage rotatably connected by at least one rotatable shaft, the engine further comprising a free turbine connected to rotate with an electrical generator, the free turbine mechanically unconnected with any compression stage of the engine, the engine further comprising a heat input apparatus adapted to convert electricity generated by the electrical generator in response to free turbine rotation into heat, wherein the heat input apparatus is adapted to add said heat to a gas turbine cycle of the gas turbine engine.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 1 shows an example of a gas turbine engine with a power transfer system;

FIG. 2 is an enlarged schematic view of an example of a power transfer system according to the invention;

FIG. 3 is a schematic view of an example of a fuel heater;

FIG. 5 is view similar to FIG. 1, showing another aspect of the system.

DETAILED DESCRIPTION OF THE PREFERRED EMBODIMENTS

Figure 4:
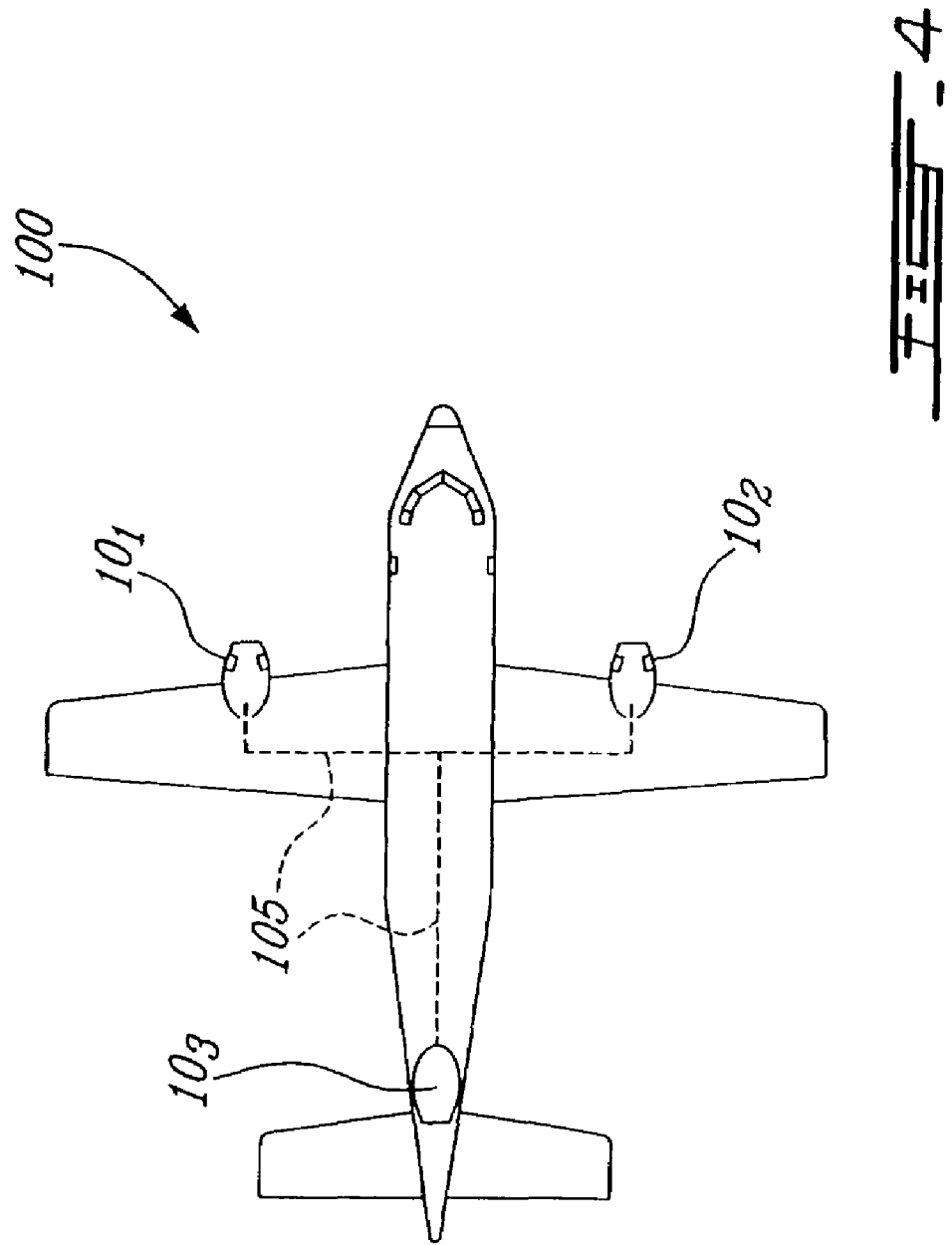
FIG. 4 is a schematic top view of a multi-engine aircraft, showing an example of environment where power can be transferred from one engine to another.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Gases flowing through the turbine section 18 follow what is referred to hereafter as the core gas path. Some of the air drawn by the fan 12 is sent to a by-pass passage 20 provided around the core of the engine 10, thereby defining the by-pass gas path. It should be noted that the expression "gas path" used herein refers either to the core gas path or the by-pass gas path.

In a multi-spool engine, the fan 12 is driven by a turbine, namely the low pressure (LP) turbine 22, via a shaft 26 (sometimes called the fan shaft). Some engines may have a single stage LP turbine, while others may have a multi-stage LP turbine. The fan 12, LP turbine 22 and LP shaft 26 together form a unit within the engine 10 which unit is sometimes referred to as the LP spool, which may also optionally include an LP compressor in addition to the fan 12.

The engine 10 also comprises a HP spool which includes the HP compressor 14 driven by a turbine 24 from the turbine section 18. The HP turbine 24 and the HP compressor 14 are connected together via a HP shaft 28. The HP spool and the LP spool are independently rotatable.

FIGS. 1 and 2 schematically show that the engine 10 is preferably provided with an Integral Starter-Generator (ISG 30) driven by or driving (as the case may be) the HP shaft 28 via an appropriate connection. In the design of FIGS. 1 and 2, ISG 30 is preferably mounted to the HP shaft 28 using a direct, coaxial mechanical mounting. The ISG 30 is preferably adapted to perform the functions of starting the engine 10 and generating electricity when the engine 10 is running.

In the design of FIGS. 1 and 2, as illustrated, the ISG 30 is coaxially mounted with reference to the HP shaft 28. In another more conventional embodiment, shown in dotted lines in FIG. 1, the ISG 30 may be replaced by a starter-generator (not shown) mounted on the accessory gearbox (AGB 19). As the skilled reader will appreciate, the AGB 19 comprises a number of mechanically-driven components. The connection between the engine and the mechanically-driven components generally involves a tower shaft and corresponding gears. The mechanically driven components include an electric starter-generator which performs a function similar to ISG 30 described herein.

FIGS. 1 and 2 further show an electrical generator 32 mounted to the LP shaft 26 in order to transform torque therefrom into electrical power. The illustrated embodiment shows the electrical generator 32 being coaxially mounted on the LP shaft 26. Other ways of connecting the electrical generator 32 can be chosen, depending on the engine. This electrical generator 32 is electrically connected to one or more electrical heaters 34, 36 located around the core gas path and the by-pass gas path, respectively such that heat developed by the heaters is transferred to the gas in the gas path. Heaters 34 and 36 are preferably resistive heaters which are provided to surround the annular gas path. The heaters are adapted to, when activated, heat the air or gas passing through the associated section of gas path, as will be discussed further below. While resistance heating is preferred, any suitable type of electrical heating such as plasma heating may be employed. One or more electrical heaters 34 can be provided anywhere in the core gas path, either upstream or downstream of the compressor section. It is preferably adjacent to the combustor 16. Heater(s) 34 may also be either upstream or downstream of the combustor 16, or even on the combustor 16. Heaters may also or alternately be located in or adjacent the gas path between turbine stages or downstream therefrom, or may be operatively associated with the fuel supply and adapted to heat the fuel using a resistive electrical fuel heater 35, as shown in FIG. 3. The skilled reader will appreciate, in light of this disclosure, that any means by which heat may be added to the gas turbine cycle may benefit from the teachings of the present invention.

One or more electrical heaters 36 can be provided in the by-pass passage 20 at a suitable location, preferably towards the downstream end of the by-pass duct is preferred.

In use, when heater(s) 34 is activated in the core gas path in the region of the combustor 16 of the engine, the heat added by the heater heats the air/gas flows passing therethrough and into the HP turbine 24, and thus has the effect as if added fuel has been burned in the combustor 16 (i.e. the combustion gases are hotter than they otherwise would have been without using more fuel at the combustor 16), and thus more thermal energy is provided to the gas flow for subsequent power extraction by the HP turbine 24. The added heat can also be used to reduce the amount of fuel supplied to the combustor 16 to attain a specific gas temperature. If heater 34 is driven by generator 32 on the LP spool, the apparatus can be employed such that torque developed by the LP turbine 22 can be partially returned to the HP turbine 24. Since resistive electrical heaters 34, 36 are very efficient at converting electrical power into heat and since turbines 22, 24 are also highly efficient, the overall efficiency of the power transfer from the LP spool to HP spool is high.

When provided in the by-pass passage 20, the heater 36 or set of heaters 36 is operated to increase the temperature of the gases in the by-pass gas path and thereby increase thrust, in a manner analogous the manner in which an afterburner can increase the thrust of a gas turbine engine.

In these and other embodiments, the source of power for the heaters 34, 36 need not be fixed, but may be flexibly controlled or set in a different arrangement than the one described above. For example, if desired, it is possible to use both the electrical generator 32 and the ISG 30, or only the ISG 30, to provide electrical power to the heater(s) 36 in the by-pass passage 20. Other combinations and permutations are further possible, for instance with the fuel heater 35.

Operation of the transfer system is controlled using a suitable controller 40, such as an electrical relay, electronic controller or another suitable arrangement, for controlling the electricity generation and flow between the electrical generator 32, the ISG 30 and the heater or heaters 34, 35, 36.

Moreover, it is possible to transfer power between two or more engines of a same aircraft using the electrical heaters, whereby electrical power generated at one or more engines is used to power heaters in one or more other engines. For example, as shown in FIG. 4, in an aircraft 100 having two engines 10, for instance turbofan engines $10_1$, $10_2$, electrical power generated by a generator (not shown) in one engine $10_1$, $10_2$ may be transferred through an aircraft power grid 105 to a suitable electrical heating arrangement (not shown) in the other engine $10_1$, $10_2$ for use therein, with or without the assistance of a generator mounted on the same engine that receives power. The engine may receive power from an engine dedicated to delivering electrical power, such as an APU $10_3$, and vice-versa.

Also, the electrical generator 32 of FIG. 2 can be used to draw power from the LP spool and thereby reduce the rotation speed of the fan 12. In an aircraft, this may allow the pilot to increase the core thrust without overspeeding the fan 12. It is also possible to simultaneously use electrical power from the ISG 30 to heat the air in the by-pass gas path.

Other benefits of the present invention includes being able to restart an aircraft engine in flight using the windmilling effect on the fan 12 caused by the continued movement of air through the moving but inoperative engine 10. The electrical power taken from the LP spool, which is windmilling, through the driven electrical generator 32 is sent to the appropriate heater to supply heat to the combustor to aid in re-lights. The electrical generator 32 can also be used to supply electrical power to other systems in case a generating failure of the ISG 30.

Referring to FIG. 5, in another aspect another turbine such as free turbine 23 may be provided preferably downstream of the low turbine 22, the turbine 23 having a generator 31 rotatably connected therewith, preferably mounted on its shaft (not indicated). Turbine 23 and generator 31 permits additional energy to be taken out of the gases before they leave the engine, that is, the rotation of turbine 23 rotates generator 31 for the generator of electrical power. That power can then be put into the gas turbine cycle, as desired, such as in ways which have already be described in this application. Thus additional energy may be reclaimed from the exhaust gases.

As can be appreciated, designing a gas turbine engine with a power transfer system as described herein provide many advantages, including being able to rematch available energy to another part of the engine when a spool is running faster than necessary during a segment of the engine cycle. This ultimately results in an increased of thrust or a decrease in fuel requirements during segments on the engine cycle. It provides an increased overall efficiency, including obtaining a better fuel consumption and particularly better handling performance during transients, if required.

The above description is meant to be exemplary only, and one skilled in the art will recognize that changes may be made to the embodiments described without departing from the scope of the invention disclosed. For example, although a two-spool engine is generally referred to herein, the invention can be used on any multi-spool engine. The invention is applicable as well to turboprop gas turbine engines, in which case the propulsor is a propeller instead of the fan 12 of the engine 10, and in turboshaft gas turbine engines, in which the reduction gearbox output (e.g. a helicopter rotor) is analogous to the fan 12 of the engine 10. The compressor and turbine can be of any kind, and either single stage or multi-stage. The invention is also not limited for use on aircraft prime-mover engines and can be implemented on various gas turbine engines used in other contexts, such as aircraft APUs and ground-based gas turbine engines. Although resistance heaters located physically outside the gas path are preferred due to their efficiency and non-interference with the gas path in such a configuration, other heating types and configurations may be provided. For example, the heater may be in, or extend into the gas path. Still other modifications of the present invention will be apparent to those skilled in the art, in light of a review of this disclosure.

What is claimed is:

1. A gas turbine engine comprising:
   at least a first and a second shaft, the first shaft rotatably supporting at least a propulsor and a low pressure turbine, the second shaft rotatably supporting at least a compressor and a high pressure turbine; and
   power transfer apparatus configured for transferring rotational power from the first shaft to the second shaft during engine operation, the power transfer apparatus including an electrical generator mounted to and driven by the first shaft, the generator operatively connected to and powering an electrical heater surrounding a conduit of the engine, the heater controlled to selectively add heat during engine operation to gases in a gas path passing through the high pressure turbine.

2. The gas turbine engine as defined in claim 1, wherein the conduit is an engine gas path and the heater is located at one or more locations selected from the group consisting of: upstream of a combustor stage of the engine, downstream the combustor stage, and in the combustor stage.

3. The gas turbine engine as defined in claim 1, wherein the engine has multiple turbines and the conduit channels the gas path between them, and the heater is located between two of said turbines.

4. The gas turbine engine as defined in claim 1, wherein the conduit is located in a fuel supply system supplying combustion fuel to a combustor of the engine, and wherein the heater is configured to heat the fuel to thereby add heat to the gas path when the fuel is combusted in the combustor.

5. The gas turbine engine as defined in claim 1, further comprising a second electrical heater connected to the generator, the second heater being disposed in a by-pass passage of the engine to selectively add heat to air therein using at least some electrical power from the generator.

6. The gas turbine engine as defined in claim 1, further comprising a second electrical generator mounted to the second shaft, and a second electrical heater connected to the first and the second generator, the second heater being disposed in a by-pass passage of the engine to selectively add heat to air therein using electrical power from at least one of the first generator, and the second generator.

7. A gas turbine engine comprising:
   at least a first and a second shaft, the first shaft rotatably supporting at least a propulsor and a low pressure turbine, the second shaft rotatably supporting at least a compressor and a high pressure turbine; and
   means for increasing engine thrust, the means electrically powered by an electric generator mounted to the first shaft, the means surrounding a conduit of the engine and configured to increase heat in gases in a gas path within the engine to increase engine thrust.

8. The gas turbine engine as defined in claim 7, wherein the conduit is a core gas path of the engine.

9. The gas turbine engine as defined in claim 7, wherein the conduit is a fuel conduit supplying a combustor of the engine.

* * * * *